US008744404B2

(12) United States Patent
Butler et al.

(10) Patent No.: US 8,744,404 B2
(45) Date of Patent: Jun. 3, 2014

(54) METHOD AND SYSTEM FOR RESTRICTED ACCESS CONFIGURATION OF ACCESS POINT BASE STATIONS

(75) Inventors: Brian K. Butler, La Jolla, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 805 days.

(21) Appl. No.: 12/200,583

(22) Filed: Aug. 28, 2008

(65) Prior Publication Data

US 2010/0056104 A1 Mar. 4, 2010

(51) Int. Cl.
*H04M 1/66* (2006.01)
(52) U.S. Cl.
USPC ............ 455/410; 455/411; 370/338; 379/189
(58) Field of Classification Search
USPC ................. 455/410, 411, 415, 416, 418, 420, 455/550.1, 556.2, 558, 561; 370/328, 338; 379/32.05, 142.01, 207.11, 207.12
See application file for complete search history.

(56) References Cited

U.S. PATENT DOCUMENTS

| 6,564,047 | B1 * | 5/2003 | Steele et al. | 455/405 |
| 7,039,425 | B1 | 5/2006 | Mazawa et al. | |
| 7,359,363 | B2 * | 4/2008 | Sakai | 370/338 |
| 2003/0142804 | A1 | 7/2003 | Yamada et al. | |
| 2005/0096009 | A1 | 5/2005 | Ackley | |
| 2005/0160138 | A1 * | 7/2005 | Ishidoshiro | 709/203 |
| 2005/0282559 | A1 * | 12/2005 | Erskine et al. | 455/456.4 |
| 2008/0096539 | A1 * | 4/2008 | Moghaddam et al. | 455/418 |
| 2008/0200146 | A1 * | 8/2008 | Wang et al. | 455/410 |
| 2009/0305671 | A1 * | 12/2009 | Luft et al. | 455/411 |

FOREIGN PATENT DOCUMENTS

| JP | 2002232554 A | 8/2002 |
| JP | 2008048259 A | 2/2008 |
| WO | WO0219682 A1 | 3/2002 |

OTHER PUBLICATIONS

International Search Report and Written Opinion—PCT/US2008/088073, International Search Authority—European Patent Office—May 14, 2009.
Taiwan Search Report—TW097151716—TIPO—Feb. 10, 2012.

* cited by examiner

*Primary Examiner* — Mahendra Patel
(74) *Attorney, Agent, or Firm* — Fariba Yadegar-Bandari

(57) ABSTRACT

Devices and methods are provided for the controlling access to access point (AP) base stations. In particular, described herein are techniques for the automated configuration of AP base stations for restricted access. For example, the technique may involve receiving a contact list from an access terminal (AT) associated with the AP base station and a network operator. From the received contact list, saved contacts associated with the operator may be identified. The technique may further involve retrieving identifiers for the identified contacts, and generating an allowed user list from the identifiers, which may be used to configure the AP base station for restricted access.

34 Claims, 10 Drawing Sheets ns for auto-
METHOD AND SYSTEM FOR RESTRICTED ACCESS CONFIGURATION OF ACCESS POINT BASE STATIONS

BACKGROUND

1. Field

The present application relates generally to wireless communications, and more specifically to techniques for automated configuration of access point base stations for restricted access.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices. In addition to mobile phone networks currently in place, a new class of small base stations has emerged, which may be installed in a user's home and provide indoor wireless coverage to mobile units using existing broadband Internet connections. Such personal miniature base stations are generally known as an access point (AP) base station, also referred to as Home Node B (HNB) unit, femto cell, femto base station (fBS), base station, or base station transceiver system (BTS). Typically, such miniature base stations are connected to the Internet and the mobile operator's network via a digital subscriber line (DSL) router or cable modem.

AP base stations or femto cells allow for cellular access where normal base station support is weak or unavailable (e.g., indoors, remote locations, and the like). AP base stations may be described as small base stations that connect to wireless service providers via a broadband backhaul link, such as digital subscriber line (DSL), cable internet access, T1/T3, etc., and offer typical base station functionality, such as base transceiver station (BTS) technology, radio network controller, and gateway support node services. This allows an access terminal (AT), also referred to as a cellular/mobile device or handset, or user equipment (UE), to connect to the AP base stations and utilize the wireless service. It is noted that ATs can include, for example, cellular phones, smart phones, laptops, handheld communication devices, handheld computing devices, satellite radios, navigational devices, PDAs, and/or any other suitable device for communicating over a wireless communication system.

There currently exist AP base stations that by default operate in open access mode, such that they are open to all customers of the network operator or wireless service provider. Such AP base stations may be configured for restricted access, such that only selected ones of the operator customers have access to the network via the femto cell. However, existing approaches for restricted access configuration of AP base stations are prohibitively difficult and time consuming. One existing approach is for the base station user/owner to call a customer care center of the network operator to create a list of approved phone numbers. Another approach commonly used in consumer networking equipment, such as Ethernet routers and wireless access points, is to serve Hyper Text Transfer Protocol (HTTP) web pages for the user to enter configuration information via a computer. Such approaches may be burdensome for consumers and may use up significant customer service resources. Accordingly, there is a need for an automated technique for restricted access configuration of AP base stations.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with controlling or restricting access to access point (AP) base stations. In particular, described herein are method and systems for restricted access configuration of AP base stations. For example, the configuration method may involve receiving a contact list from an access terminal (AT) or mobile device associated with the AP base station. The contact list may include information regarding a mobile device user's saved contacts.

From the received information regarding the contacts, saved contacts associated with the operator may optionally be identified. The method may involve retrieving identifiers for the respective identified contacts, and may yet further involve generating an allowed user list based at least in part on the at retrieved identifiers. The allowed user list may be utilized to restrict, control, or otherwise manage access to the AP base station.

In related aspects, the step of utilizing the allowed user list may involve, in response to a visitor AT or device entering a coverage area of an AP base station, determining whether a visitor identifier of the visitor AT matches at least one entry of the allowed user list. This step may further comprise, in response to the visitor identifier matching the at least one entry of the allowed user list, allowing the visitor AT to access the AP base station. In response to the visitor identifier not matching any entry of the allowed user list, the visitor AT may be denied to access the AP base station.

In further related aspects, the configuration method may involve receiving a calling history for the AT, and may further involve generating the allowed user list based at least in part on information in the calling history. This approach may be in lieu of or in addition to receiving and using the contact list from the AT.

According to further related aspects, there is provided a wireless communication apparatus for restricted access configuration of an AP base station, comprising a receiver, a memory, and at least one processor in operative communication with the receiver and the memory. The receiver may be adapted to receive a contact list, calling history, or the like from an AT associated with the AP base station.

The memory may include executable code for the at least one processor to configure restricted access to the AP base station based at least in part on the information of the contact list. The at least one processor may generate an allowed user list based at least in part on retrieved identifiers, and may utilize the allowed user list to control AP access.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
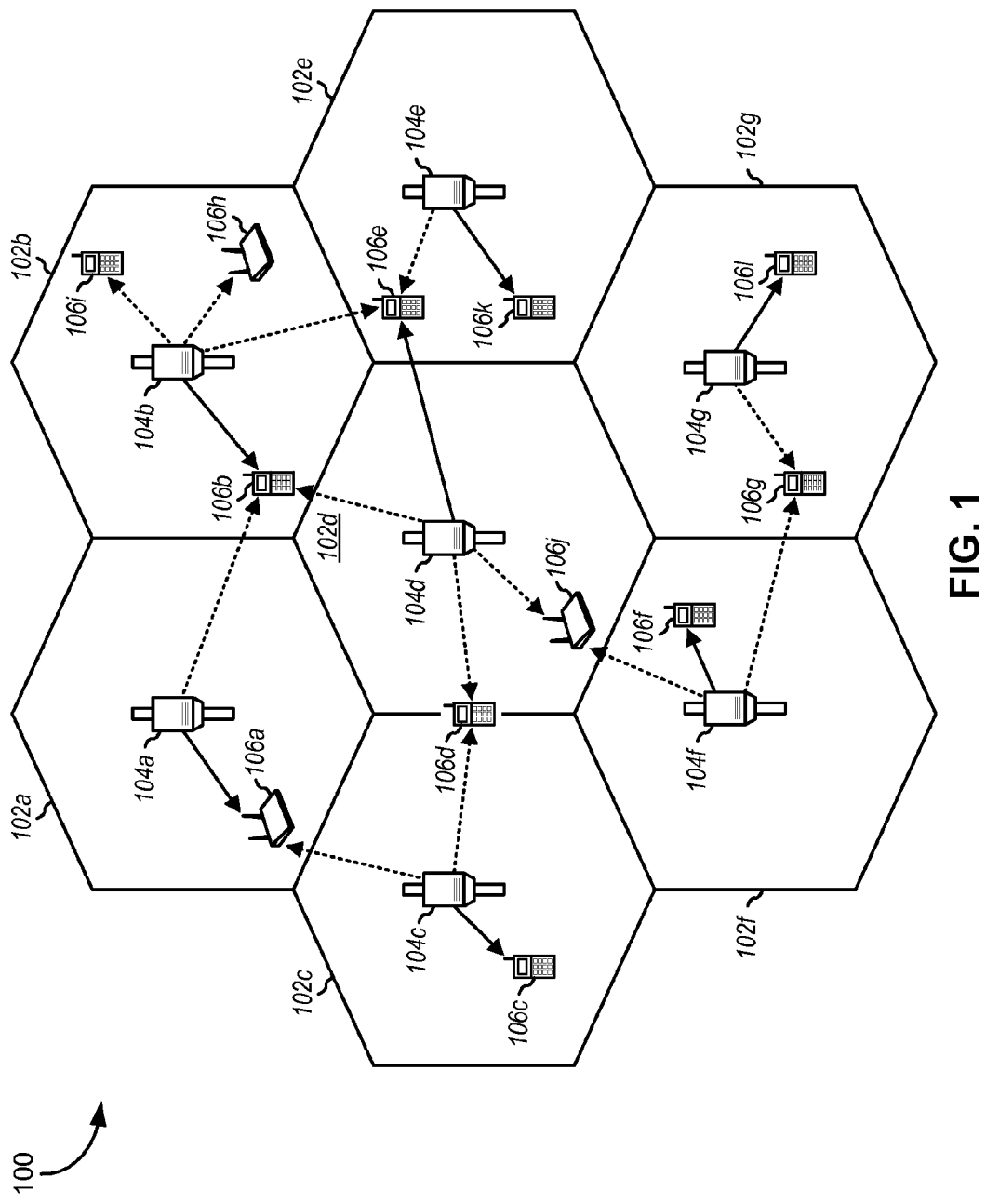
FIG. 1 illustrates an exemplary wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As previously mentioned, existing approaches for restricting access to access point (AP) base stations may be prohibitively difficult and time consuming for customers or require substantial operator customer service resources. The techniques described herein address the need for an automated technique that uses information stored on an AP base stations owner's access terminal (AT) (e.g., contacts lists, calling histories, etc.) to configure the AP base station for restricted access.

AP base stations can be deployed to individual consumers and placed in homes, apartment buildings, office buildings, and the like. An AP base station can communicate wirelessly with an AT in range of the AP base station utilizing a licensed cellular transmission band. Further, AP base stations may be connected to a core cellular network by way of an Internet Protocol (IP) connection, such as a Digital Subscriber Line (DSL, e.g., including Asymmetric DSL (ADSL), High data rate DSL (HDSL), Very high speed DSL (VDSL), etc.), a TV cable carrying Internet Protocol (IP) traffic, a Broadband over Power Line (BPL) connection, or like connection. The connection between the IP line and the cellular network can be a direct connection, or by way of the Internet. An AP base station, therefore, can provide cellular support to an AT or cellular handset and route cellular traffic (e.g., voice, data, video, audio, Internet, etc.) to a macro cellular network through the IP connection. This mechanism can save consumers air time costs and reduce a network provider's cellular network traffic load. Also, cellular coverage inside a home, office building, apartment, etc. can be greatly improved via implementation of AP base stations.

Although an AP base station is capable of forming a cellular link (e.g., a wireless link utilizing one or more licensed radio network frequencies) with multiple ATs, a consumer typically desires only his or her own traffic to be carried by a private IP connection connected to the AP base station. For instance, consumers may wish to preserve IP bandwidth for their own use, rather than for the use of other AT users. As a result, a AP base station is generally associated only with a single AT or group of ATs, and traffic related to such AT(s) is routed over the consumer's IP connection, whereas traffic related to other ATs is blocked. Consequently, although the AP base station can communicate with multiple ATs regardless of subscriber, the AP base station is typically programmed to ignore devices that are not associated with a particular consumer, service plan, and/or the like.

FIG. 1 illustrates an exemplary wireless communication system 100 adapted to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding AP base station 104 (such as AP base stations 104a-104g). Each cell may be further divided into one or more antenna groups, also referred to as sectors. Various ATs 106, including ATs 106a-106k may be dispersed throughout the system 100. Each AT 106 may communicate with one or more APs 104 on a forward link and/or a reverse link at a given moment, depending upon whether the AT is active and whether it is in soft handoff, for example. The wireless communication system 100 may provide service over a large geographic region, for example, macro cells 102a-102g may cover a few blocks in a neighborhood.

Figure 2:
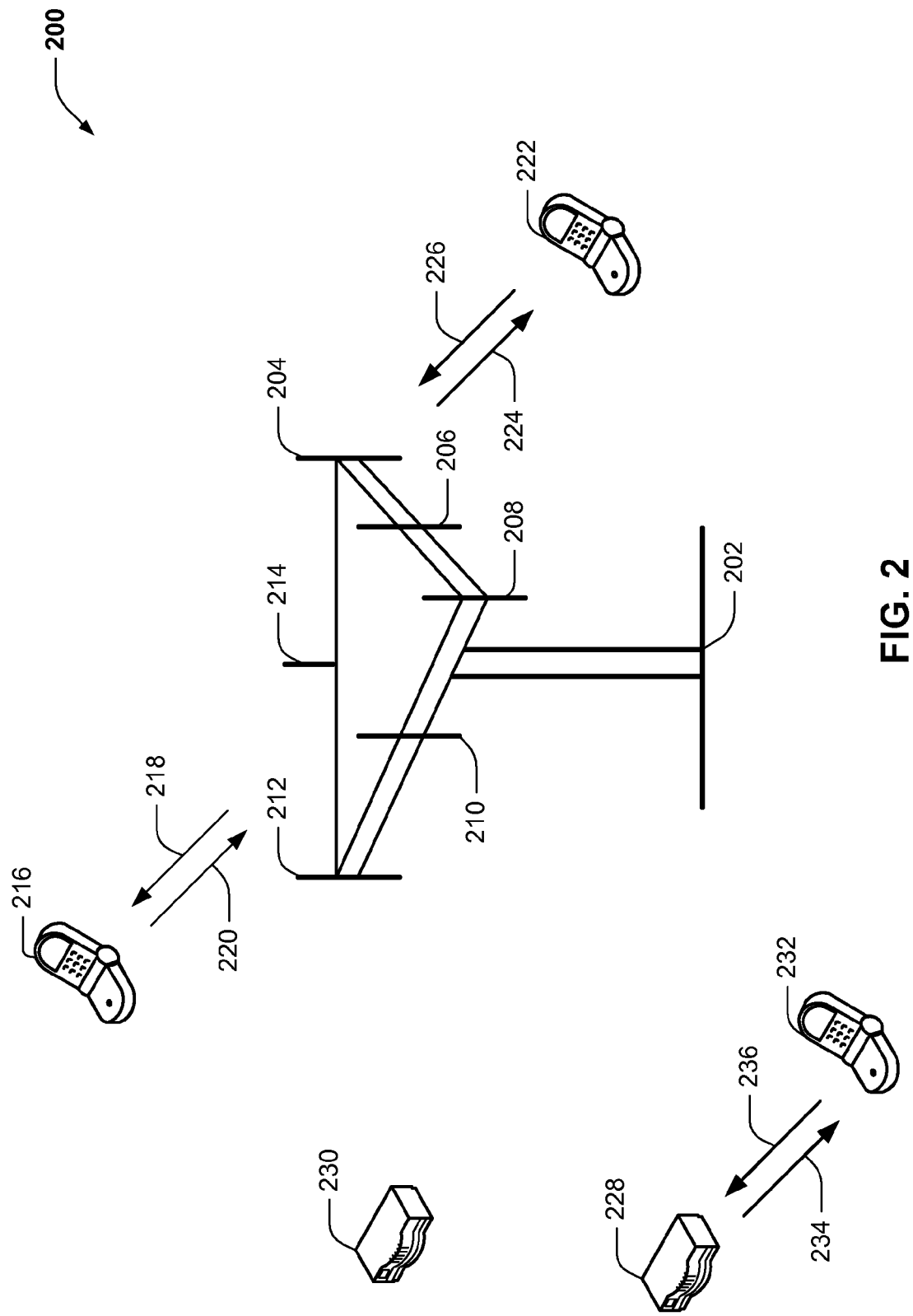
FIG. 2 is an illustration of a wireless communication system in accordance with various aspects set forth herein.

Referring now to FIG. 2, a wireless communication system 200 is illustrated in accordance with various embodiments presented herein. System 200 comprises a base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 202 can communicate with one or more ATs, such as, for example, AT 216 and AT 222.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a Frequency Division Duplex (FDD) system, forward link 218 can utilize a different frequency band than that used by reverse link 220, and forward link 224 can employ a different frequency band than that employed by reverse link 226, for example. Further, in a Time Division Duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of base station 202. For example, antenna groups can be designed to communicate to ATs in a sector of the areas covered by base station 202. In communication over forward links 218 and 224, the transmitting antennas of base station 202 can utilize beamforming to improve signal-to-noise ratio of forward links 218 and 224 for ATs 216 and 222. Also, while base station 202 utilizes beamforming to transmit to ATs 216 and 222 scattered randomly through an associated coverage, ATs in neighboring cells can be subject to less interference as compared to a base station transmitting through a single antenna to all its ATs. Moreover, ATs 216 and 222 can communicate directly with one another using a peer-to-peer or ad hoc technology in one example.

Similar functionality of base station 202 can be implemented in AP base stations 228 and 230, which can be deployed in smaller scale locations, such as a residence or office building for example. As mentioned previously, AP base stations are also referred to as femto cells or Home Node B (HNB) units, and can have a broadband backhaul link to a wireless service provider, such as over DSL, cable, T1/T3, etc., and can provide wireless communication service to one or more ATs. As shown, AP base station 228 can communicate with one or more AT(s) 232 over a forward link 234 and receive communication from the AT(s) 232 over a reverse link 236 similarly to the base station 202.

According to an example, AP base station 230 can be deployed to provide wireless service access. AP base station 230 can connect to a wireless service access provider via broadband backhaul link, one or more disparate femto cells or macro cells over-the-air, etc. Upon being deployed, AP base station 230 can optionally self-configure to avoid interference with surrounding femto cells (e.g., AP base station 228) and macro cells (e.g., base station 202 or a sector/cell thereof). In this regard, AP base station 230 can receive signals from the base station 202 and disparate AP base station 228 much like ATs 216, 222, and 232. The signals can be overhead system messages that can be utilized by the AP base station 230 to determine configuration parameters utilized by the disparate AP base station 228 and/or base station 202.

The configuration parameters can be determined by AP base station 230 for similar environment configuration. In addition, the parameters can be determined and utilized to ensure AP base station 230 selects different parameters to mitigate interference. These parameters can include, for example, a channel identifier (e.g., a Code Division Multiple Access (CDMA) channel ID), a pseudo-noise (PN) offset, and/or the like, for AP base station 228, base station 202, and/or substantially any other surrounding transmitters. AP base station 230 can accordingly self-configure its channel identifier, PN offset, etc. so as not to interfere with the surrounding femto cells and macro cells. Additionally, AP base station 230 can utilize this information to build a neighbor list of surrounding femto cells and macro cells to facilitate hard and soft handoffs for devices communicating with AP base station 230. It is noted that AP base station 230 may be adapted to receive RF signals, for example, from AP base station 228 and/or base station 202 to determine timing, location, and/or the like.

Figure 3:
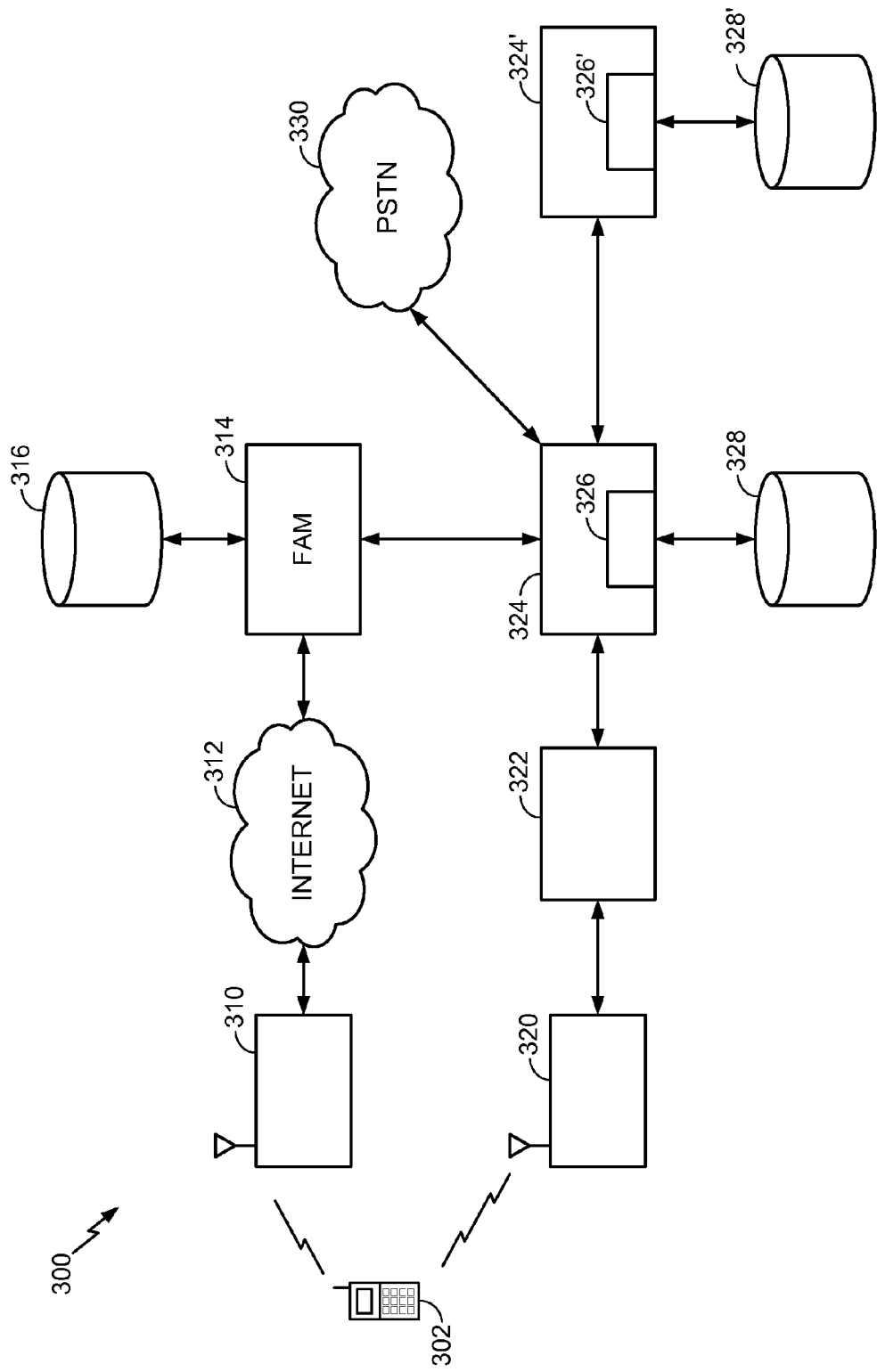
FIG. 3 illustrates an exemplary communication system with automated restricted access configuration of an access point (AP) base station.

FIG. 3 provides a block diagram of an exemplary communication system 300 with automated restricted access configuration of an AP base station 310 based at least in part on information from or associated with an AT 302 adapted to communicate on a network of a given network operator. The system 300 may include AP base station 310 in operative communication with a Femto Access Manager (FAM) 314 or the like via a broadband backhaul link 312, such as, for example, DSL, cable internet access, T1/T3, or the like.

It is noted that, while only one AP base station 310 is shown in FIG. 3, the system 300 may include multiple AP base stations, each being installed in a corresponding small scale network environment, such as, for example, in one or more user residences, and being adapted to serve associated, as well as alien, AT(s). It is further noted that, although certain embodiments described herein use 3GPP terminology, the embodiments may be applied to 3rd Generation Partnership Project (3GPP) (Rel99, Rel5, Rel6, Rel7) technology, as well as 3GPP2 (1xRTT, 1xEV-DO Rel0, RevA, RevB) technology, and other known and related technologies.

The system 300 may also include a node B or base station 320 in operative communication with a radio network controller (RNC) 322 or the like. The RNC may be in operative communication with a message switching center (MSC) 324 or similar service delivery node responsible for handling voice calls, short message service (SMS), as well as other services (e.g., conference calls, FAX and circuit switched data). The MSC 324 or the like may set up and release the end-to-end connections, handle mobility and hand-over requirements during the call, take care of charging and real time pre-paid account monitoring, etc.

The MSC 324 may include, or otherwise be in communication with, a visitor location register (VLR) 326 or similar temporary database of network subscribers who have entered or roamed into a particular area. The VLR 326 may be in operative communication with a registry 328, which may generally comprise a database that contains details of mobile phone subscribers authorized to use the operator's network. For example, the registry 328 may comprise an HLR in the illustrative context of a Global System for Mobile Communications (GSM) core network.

The MSC 324 may be in operative communication with a public switched telephone network (PSTN) 330 or the like. The system 300 may further include additional MSCs and registries in operative communication with the MSC 324, such as, for example, MSC 324', VLR 326', and registry 328'.

The FAM 314 may comprise a computing/network device or server, and may be in operative communication with a database 316. The database 316 may store information including or relating to one or more of AP base station identities, owner identities, owner passwords, allowed identities, or the like.

In related aspects, the customer or user of the AT 302 may add phone numbers to a contact list/phonebook on his/her AT 302. The contact list may be stored as a data file on the AT 302 and/or remotely, such as, for example, at a FAM 314 or registry 328 of the network. It is noted that the AT 302 may comprise one or more contact lists. In one embodiment, the AT 302 may store a single contact list for the mobile device user. In another embodiment, the AT 302 may store multiple contact lists, such as, for example, a general contact list and a restricted access contact list for those contacts that the AT user wishes to provide AP base station access. The restricted access contact list may be a subset of the general contact list. It is noted, however, that the allowed user list generated by the FAM 314 may comprise a subset of the user's restricted access contact list since it is possible that some of the contacts in the user's restricted access contact list may not be customers of the network/service that the user's AP base station 310 is associated with.

For example, the contact list stored on AT 302 may be sent to or retrieved by a network entity, such as, for example, AP base station 310 and optionally FAM 314.

This may be accomplished via an application level software on the AT, such as, for example, a BREW-based application. The transmission of the contact list to AP base station 310 may be initiated by the user of AT 302 (e.g., with prompts from the BREW application), and/or by service center personnel associated with the network.

The user of AT 302 may enter a password associated with his/her AP base station 310 to validate his/her ownership of the AP base station 310. For example, the password may comprise a base station/unit/equipment specific password supplied with AP base station 310. In the alternative, or in addition, service personnel may check or cross-reference the identity of AT 302 with the AP base station identity in database 316 to verify there is a match between the mobile device identity and the AP base station identity.

FAM 314 or other network entity may look up the AP base station identity for a given transaction based at least in part on an AT identity (ID), identifier, and/or other related data entered by the AT user. FAM 314 or other network entity may validate the given transaction by using the AT ID and/or the password. For example, FAM 314 may validate the transaction when the AT's ID matches a stored owner's AT ID or the like.

The collected contact list may optionally be processed by a network entity with access to the network operator's phone number database. Phone numbers belonging to other operators may be eliminated. Valid phone numbers (i.e., those phone numbers belonging to those contacts in the contact list who are customers of the network that AP base station 310 is associated with) may be looked up by the network entity to produce equipment or device IDs, International Mobile Subscriber Identity (IMSI), or other identifiers used to control network/system access.

For example, FAM 314 may process the received contact list and may communicate with the one or more registries 328 to convert the stored phone numbers of the contact list into subscriber identities. It is noted that all, a subset, or sometimes none of the stored phone numbers may correspond to subscribers of the network which AP base station 310 is associated with. With respect to those phone numbers corresponding to the network subscribers, the subscriber identities and/or related information may be gathered and used to generate an allowed user list. The allowed user list may be saved in FAM 314, and FAM 314 may optionally perform restricted access control for AP base station 310 during call setup. In the alternative, or in addition, the allowed user list may be sent to AP base station 310 securely, such that AP base station 310 may perform restricted access control itself.

The subscriber identities in the allowed user list may be transmitted and stored in a secure manner, such that it is difficult to read out of or steal such information from AP base station 310. For example, the subscriber identifies in the allowed user list may be of a temporary nature, such as a Temporary Mobile Subscriber Identity (TMSI) or the like. In the alternative, or in addition, one or more secure private networks (SPNs) may be established within backhaul 312 to provided secured communication between FAM 314 and AP base station 310. Each SPN may provide an IP secure tunnel across one or more segments of a public network, which may include one or more public portions of the Internet (e.g., 802.3, DSL, cable, Ethernet, etc.).

The SPNs may be established according to any known technique, such as, for example, via the creation of virtual private networks (VPNs), in which some of the links between nodes are carried by open connections or virtual circuits in a larger network, such as, for example, public portions of the Internet. Link-layer protocols of the virtual network may be tunneled through the larger network. It is noted that the public network may comprise any communication network, wired or wireless, utilizing any known standards, such as, for example, a wide area network (WAN), a campus area networks (CAN), a metropolitan area networks (MAN), a wireless application protocol (WAP), etc. It is further noted that the public network may include a wireless local area network (WLAN), such as, for example, 802.11a, 802.11b, 802.11g, 802.11n, etc. The WAN macro cell may be based on Ultra Mobile Broadband (UMB), Long Term Evolution (LTE), Worldwide Interoperability for Microwave Access (WiMAx), etc. The system 300 may comprise WAN macro cells and femto cells deployed within the same general geographical area that reuse the same carrier as the WAN system. The WAN system may use legacy technology, such as, for example, UMB, while the femto system may use a new technology, such as, for example, an evolved version of UMB that supports AP base station operation efficiently.

In further related aspects, AT 302 may comprise a data file that may be sent to AP base station 310, FAM 314 or another network entity for the generation of the allowed user list. For example, the data file may comprise a phone or contact list, as explained above. In another example, the data file may comprise a phone's calling history, as generally kept for quick reference by the phone user and/or for billing records within the network. Accordingly, information stored in the data file (e.g., the contact list, the calling history, and variations/combinations thereof) may be used to generate the allowed user list. Again, it is noted that only a subset of the information in the data file may be used to create or be a part of the allowed user list, since some of the contacts or phone numbers in the data file may not correspond to customers who subscribe to or are associated with the AP base station's network. Further, it is noted that the data file may be located on AT 302. In the alternative, or in addition, the data file may be stored remotely, relative to AT 302, such as, for example, at FAM 314, registry 328, or other network entity.

Figure 4:
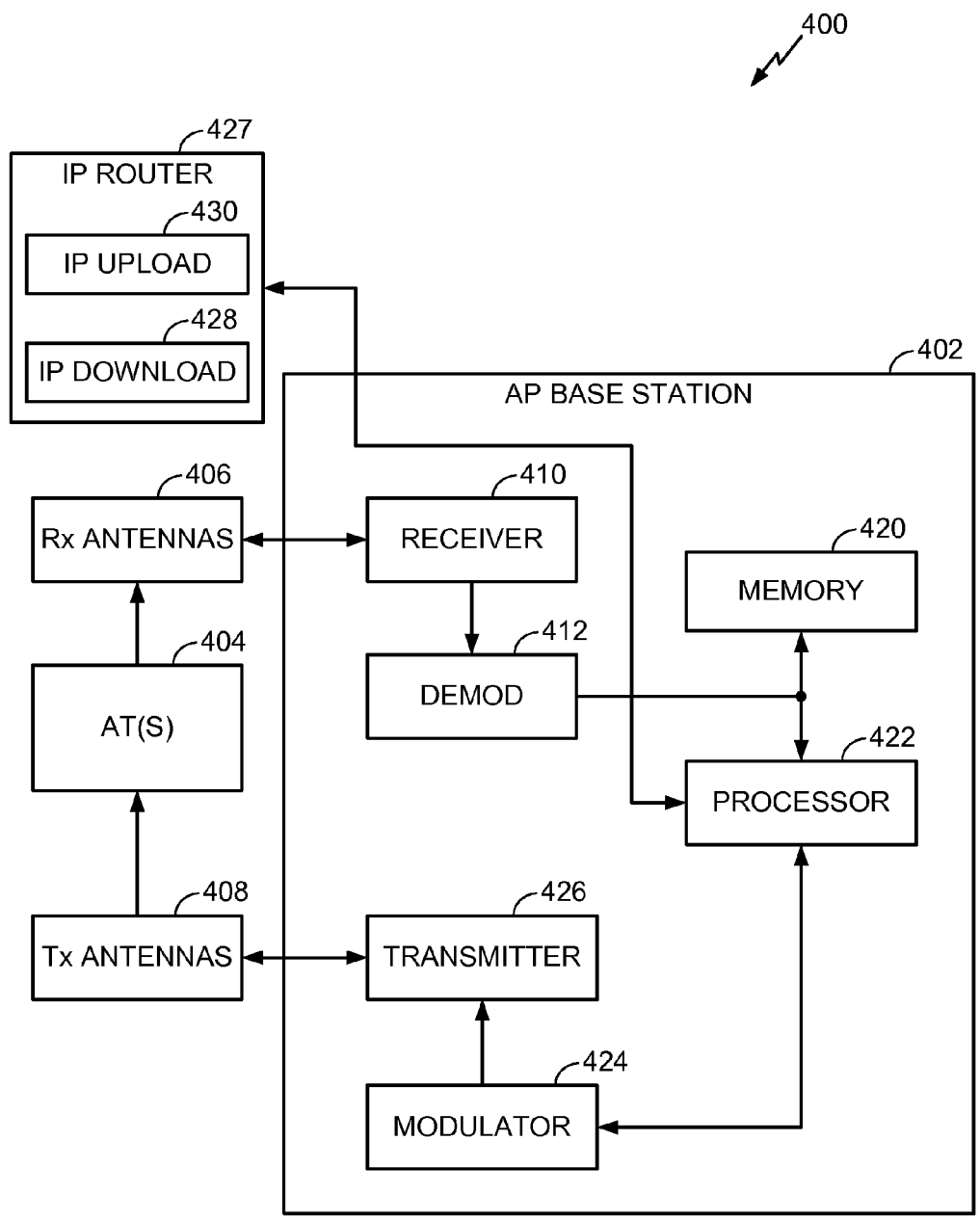
FIG. 4 depicts a block diagram of an exemplary AP base station.

With reference to FIG. 4, there is provided an exemplary system 400 that includes an AP base station 402 with a receiver component/module 410 adapted to receive signal(s) from AT(s) 404 or from other AP base stations (not depicted) through a plurality of receive antennas 406. AP base station 402 may also include a transmitter component/module 426 adapted to transmit to AT 404 or the like through one or more transmit antennas 408. Receiver component 410 may receive information from receive antennas 406 and may further comprise a signal recipient (not shown) that receives uplink data transmitted by the AT(s) 404. It should be appreciated that receiver component 410 and transmission component 426 may both include WLAN, BPL, Ethernet, Universal Mobile Telecommunication System (UMTS) TDD, or WLAN over UMTS TDD spectra communication capabilities to interact with ATs or with other AP base stations.

Receiver component 410 may be operatively associated with a demodulator 412 adapted to demodulate received information. Demodulated symbols may be analyzed by a network processor 422 to generate additional signals (e.g., in the form of transmission and/or routing instructions) modulated by modulator 424 and transmitted by transmitter component 426. Further, processor 422 may be coupled to a memory module/component 420. Memory module 420 may store information pertinent to effectuating wired and/or wireless communication, application modules for maintaining a femto network and routing information between AP base stations and/or with connected ATs, and/or any other suitable information related to performing the various actions and functions set forth herein.

Processor 422 may route at least a portion of traffic associated with a communication link between AP base station 402 and AT 404 to a neighboring AT base station (not depicted) for transfer to a cellular network (e.g., by way of a direct connection to the cellular network, or by way of the Internet). Furthermore, processor 422 may be adapted to direct traffic affiliated with AP base station 402 (e.g., generated by a predetermined AT or group of ATs, for instance) directly to the cellular network by way of an IP upload link 430 (e.g., DSL connection, such as ADSL, VDSL, HDSL etc., cable IP connection, BPL connection). In addition, data may be received from the cellular network via an IP download link 428 (e.g., DSL, cable, BPL) and directed to AT 404 affiliated with the AP base station 402. It is noted that AP base station 402 may comprise one or more processors 422.

Receiver component 410 and transmission component 426 may receive and transmit, respectively, various information to/from a cellular network (e.g., via IP upload 430 and/or IP download 428) or to/from other AP base stations of the femto network by way of an IP router 427 that communicates over unlicensed frequencies or wired connections (e.g., WLAN router, LAN router, or the like). It is noted that the receiver and transmitter components/modules 410, 426 may be part of or replaced with a transceiver module (not depicted) in other embodiments. The depicted receiver 410 and transmitter 426, or alternatively a transceiver, may be adapted to support communication links with a plurality of AP base stations.

In related aspects, memory 420 may contain application modules or applications that generate or comprise code/instructions for configuring AP base station 402 for restricted access. For example, memory 420 may include executable code for processor 422 to retrieve or receive a data file, such as, for example, a contact list or calling history, from AT 404. The contact list and/or calling history may include information (e.g., phone numbers) of the AT user's saved contacts. Memory 420 may further include executable code for processor 422 to configure restricted access to AP base station 420 based at least in part on the contact list and/or calling history from AT 404.

Memory 420 may further include executable code for processor 422 to verify ownership of AP base station 402, such as by receiving a password associated with the AP base station 402. Memory 420 may comprise a password (specific for AP base station 402) supplied with base station 402, which the user of AT 404 should provide to a network entity (e.g., base station 402, the FAM, etc.) to validate his/her ownership of the base station 402. Processor 422 may optionally be adapted to instruct transmitter 426 to send the password to another network entity (e.g., the FAM) upon establishing a secured communication tunnel with the network entity. In the alternative, or in addition, the FAM or the like may comprise or otherwise have access to a database of passwords that are specific to one or more AP base stations.

AP base station 402 may be associated with a network operator, and memory 420 may optionally further include executable code for processor 422 to identify those saved contacts in the contact list (or telephone numbers in the calling history) that are associated with the network operator. Memory 420 may further include executable code for processor 422 to retrieve an identifier for such contacts from the contact list, to generate an allowed user list based at least in part on the retrieved identifier, and to utilize the allowed user list to configure the restricted access to the cellular network via AP base station 402.

In response to a visitor AT entering a coverage area of AP base station 402, processor 422 may be adapted to determine whether a visitor identifier of the visitor AT matches at least one entry of the allowed user list. When the visitor identifier matches at least one entry of the allowed user list, processor 422 may be adapted to allow the visitor AT to access a network via AP base station 402.

In the alternative, or in addition, memory 420 may include executable code for processor 422 to retrieve an identifier for such contacts from a registry of the network operator (e.g.,. registry 328 in FIG. 3), to generate an allowed user list based at least in part on the retrieved identifier, and to utilize the allowed user list to configure the restricted access to the cellular network via AP base station 402. Processor 422 may retrieve the identifier by accessing an HLR of the network operator and/or by obtaining an equipment ID used to control network access.

Figure 5:
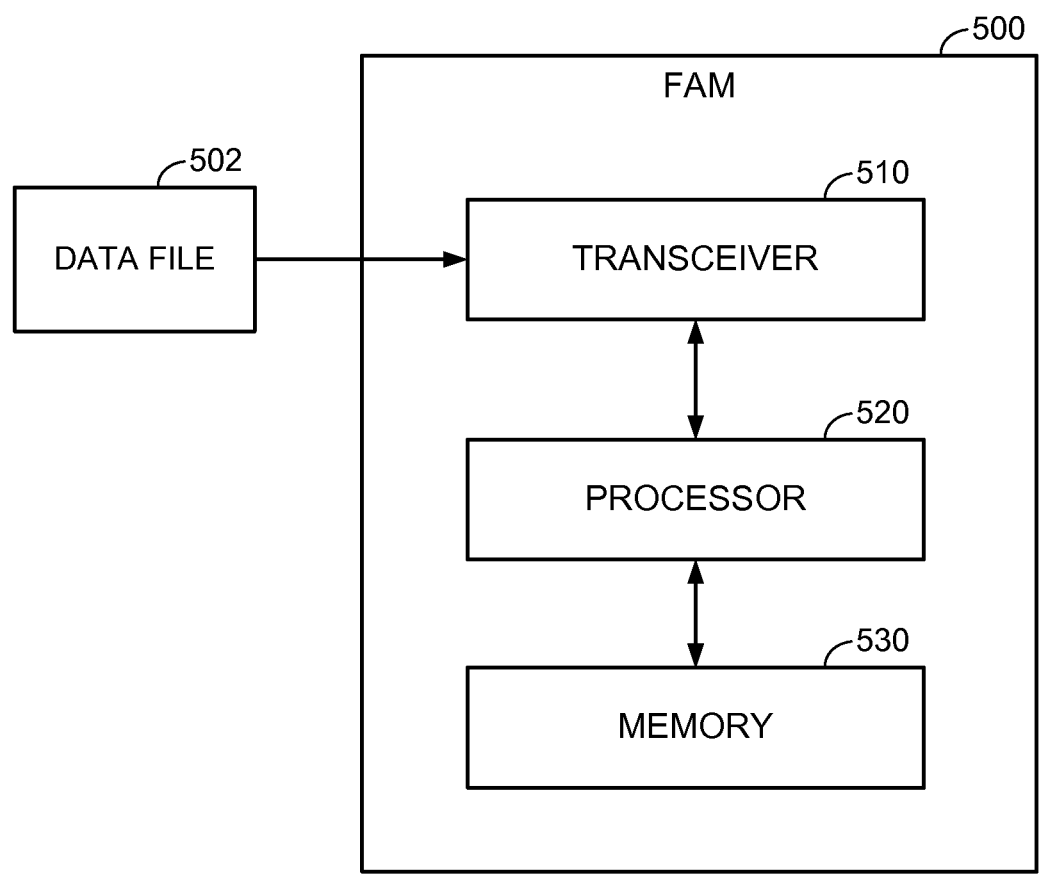
FIG. 5 depicts a block diagram of an exemplary femto access manager (FAM).

With reference to FIG. 5, there is provided an exemplary Femto Access Manager (FAM) 500 that includes a transceiver 510, a processor 520 in operative communication with the transceiver 510, and a memory 530 in operative communication with the processor 520. Transceiver 510 may be adapted to receive a data file 502 (e.g., a contact list, calling history, etc.) directly or indirectly from an AT associated with an AP base station. It is noted that transceiver 510 may receive data file 502 from an AP base station. It is further noted that transceiver 510 may be substituted with a receiver and a transmitter, each being in operative communication with processor 520.

Memory 530 may include executable code for processor 520 to analyze/process/review received data file 502, and to and optionally identify any saved contacts and/or telephone numbers associated with a given network operator. Memory 530 may further include executable code for processor 520 to retrieve identifiers (e.g., device IDs, International Mobile Subscriber Identity (IMSI), other identifiers used to control network/system access, etc.) for the identified contacts from one or more registries (e.g., HLRs or the like) of the network operator. Memory 530 may further include executable code for processor 520 to generate an allowed user list based at least in part on the retrieved identifiers, and to utilize the allowed user list to restrict/control access to the network via one or more AP base stations associated with the network. In the alternative, or in addition, processor 520 may be adapted to instruct transceiver 510 to send the allowed user list to a given AP base station, which in turn may utilize the allowed user list to control access to the given AP base station, and therefore control access to the network via the given AP base station.

In one illustrative embodiment, memory 530 may optionally include executable code for processor 520 to identify in the data file at least one contact associated with the network operator, and to retrieve at least one identifier for the at least one contact from a registry of the operator. Memory 530 may further include executable code for processor 520 to generate an allowed user list based at least in part on the at least one retrieved identifier, and to utilize the allowed user list to control AP base station access. For example, processor 520 may utilize the allowed user list by, in response to a visitor device entering a coverage area of a given AP base station, determining whether a visitor identifier of the visitor device matches at least one entry of the allowed user list. When the visitor identifier matches the at least one entry of the allowed user list, processor 520 may allow the visitor device to access the given AP base station. When the visitor identifier does not match the at least one entry of the allowed user list, processor 520 may deny the visitor device from accessing the given AP base station.

In related aspects, transceiver 510 may receive a unique identifier from a given AP base station, and processor 520 may check the unique identifier to verify ownership of the give AP base station. Processor 520 may verify ownership by receiving a password associated with the given AP base station. In further related aspects, processor 520 may retrieve the unique identifier from an HLR of the network operator. Processor 520 may retrieve the identifier by obtaining an equipment ID used to control network access. In yet further related aspects, FAM 500 may store the allowed user list in memory 530. In the alternative, or in addition, FAM 500 may send the allowed user list, or copy thereof, to the AP base station for storage and restricting access to the AP base station.

Figure 6:
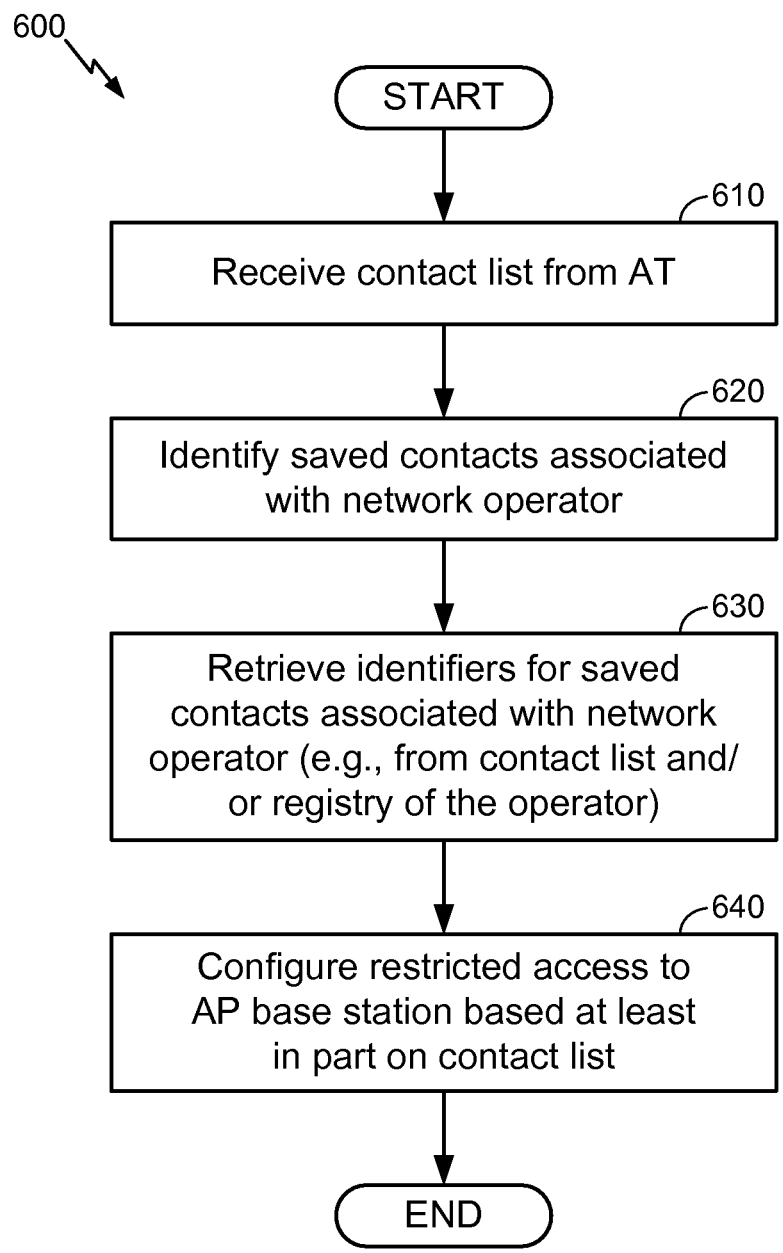
FIG. 6 depicts a flowchart of an exemplary method for controlling access to an AP base station.

In accordance with one or more aspects of the embodiments described herein, there are provided methods for restricted access configuration of an AP base station. With reference to the flow chart shown in FIG. 6, the method 600 may involve receiving a contact list from an AT that is in operative communication with the AP base station (step 610). The contact list may include phone numbers or other information regarding the AT user's saved contacts. Optional step 620 may involve identifying those saved contacts that are associated with the operator from the contact list.

Optional step 630 may include retrieving identifiers (e.g., equipment IDs used to control network access) for the saved contacts in the contact list, such as, those saved contacts associated with the network operator. The identifiers may be retrieved from the contact list of from other data files on the AT. In the alternative, or in addition, the identifiers may be retrieved from one or more network entities, such as, for example, the FAM or the HLR of the network operator.

Subsequent step 640 may involve configuring restricted access to the AP base station based at least in part on the information of the contact list, thereby allowing those saved contacts associated with the operator to access the AP base station. Step 640 may comprise generating an allowed user list based at least in part on the identifiers retrieved from the contact list and/or the HLR or the like. Step 640 may further comprise utilizing the allowed user list to control access to the AP base station.

For example, step 640 may comprise, in response to a visitor device entering a coverage area of a the AP base station, determining whether a visitor identifier of the visitor device matches at least one entry of the allowed user list. In response to the visitor identifier matching the at least one entry of the allowed user list, the visitor device may be allowed to access the AP base station. If the visitor identifier does not match any entry of the allowed user list, the visitor device may be denied access to the AP base station.

In related aspects, method 600 may further comprise verifying ownership of the AP base station, such as, for example, by collecting an AP base station ID from the base station and/or receiving a password associated with the base station from an AT that is in operative communication with or otherwise associated with the AP base station.

In further related aspects, method 600 may comprise retrieving or receiving a calling history (in lieu of or in addition to the contact list) from the AT, and may further comprise generating the allowed user list based at least in part on identifiers (e.g., telephone numbers) in the received calling history. In yet further related aspects, step 640 may comprise sending the allowed user list to the FAM, which in turn uses the allowed user list to control access to the AP base station. In the alternative, or in addition, one or more steps, or subsets thereof, of method 600 may be performed by other network entities of the network operator.

Figure 7:
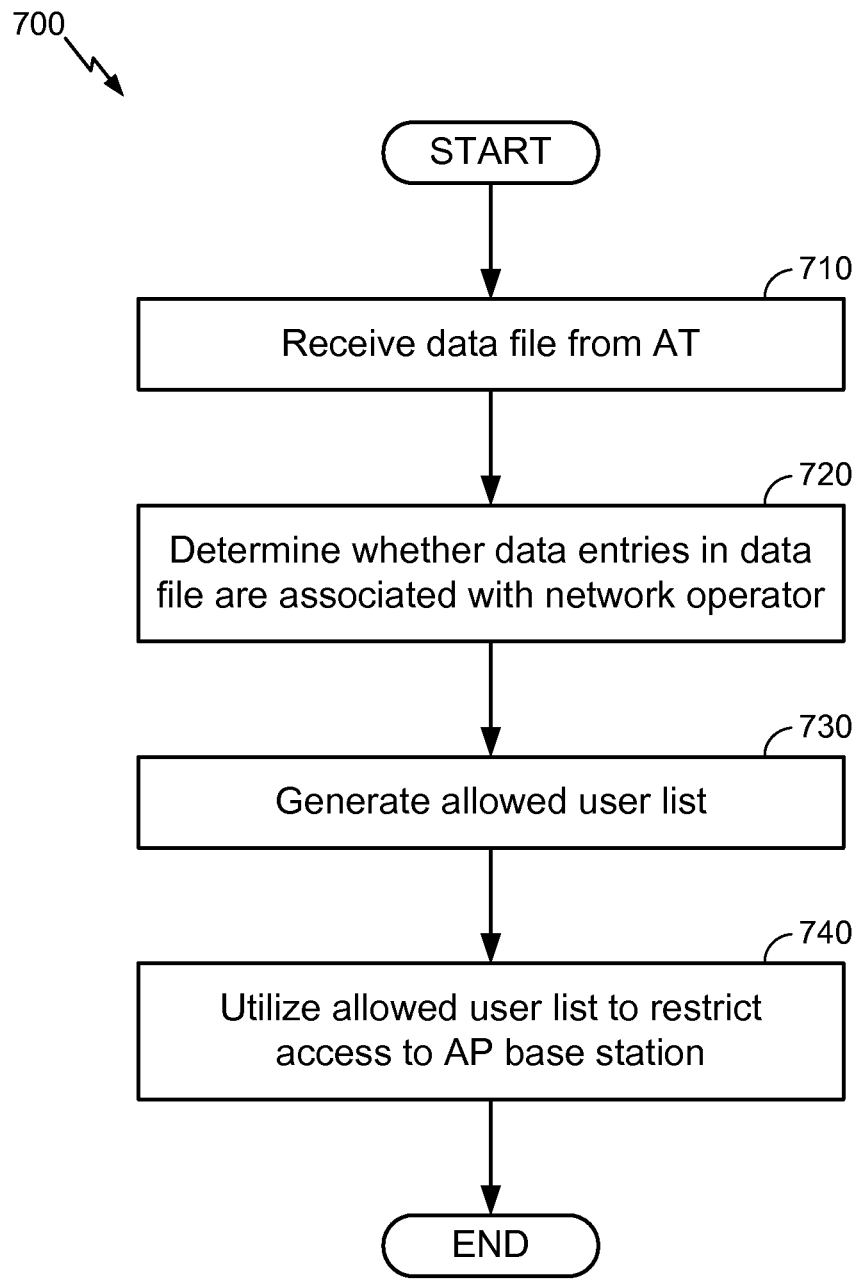
FIG. 7 depicts a flowchart of an exemplary method for configuration an AP base station for restricted access.

With reference to the flow chart shown in FIG. 7, there is provided a method 700 that comprises receiving a data file from an AT associated with an AP base station (step 710). The data file may comprise a contact list, call history, or the like, or combinations thereof Optional step 720 may involve determining whether any of the data entries in the data file are associated with or correspond to a given cellular network operator. In response to a given data entry in the data file being associated with the given operator, an allowed user list is generated based at least in part on the given data entry (step 730). Step 730 may comprise retrieving an identifier for the given data entry from the data file or from other files or memories of the AT. In the alternative, or in addition, step 730 may comprise retrieving the identifier for the given data entry from a registry (e.g., HLR or the like) of the network. Next, the allowed user list may be used to restrict access to the AP base station (step 740). In the alternative, or in addition, the allowed user list may be sent to the FAM or the like, which in turn may use the allowed user list to control which ATs may access the network via the AP base station.

Figure 8:
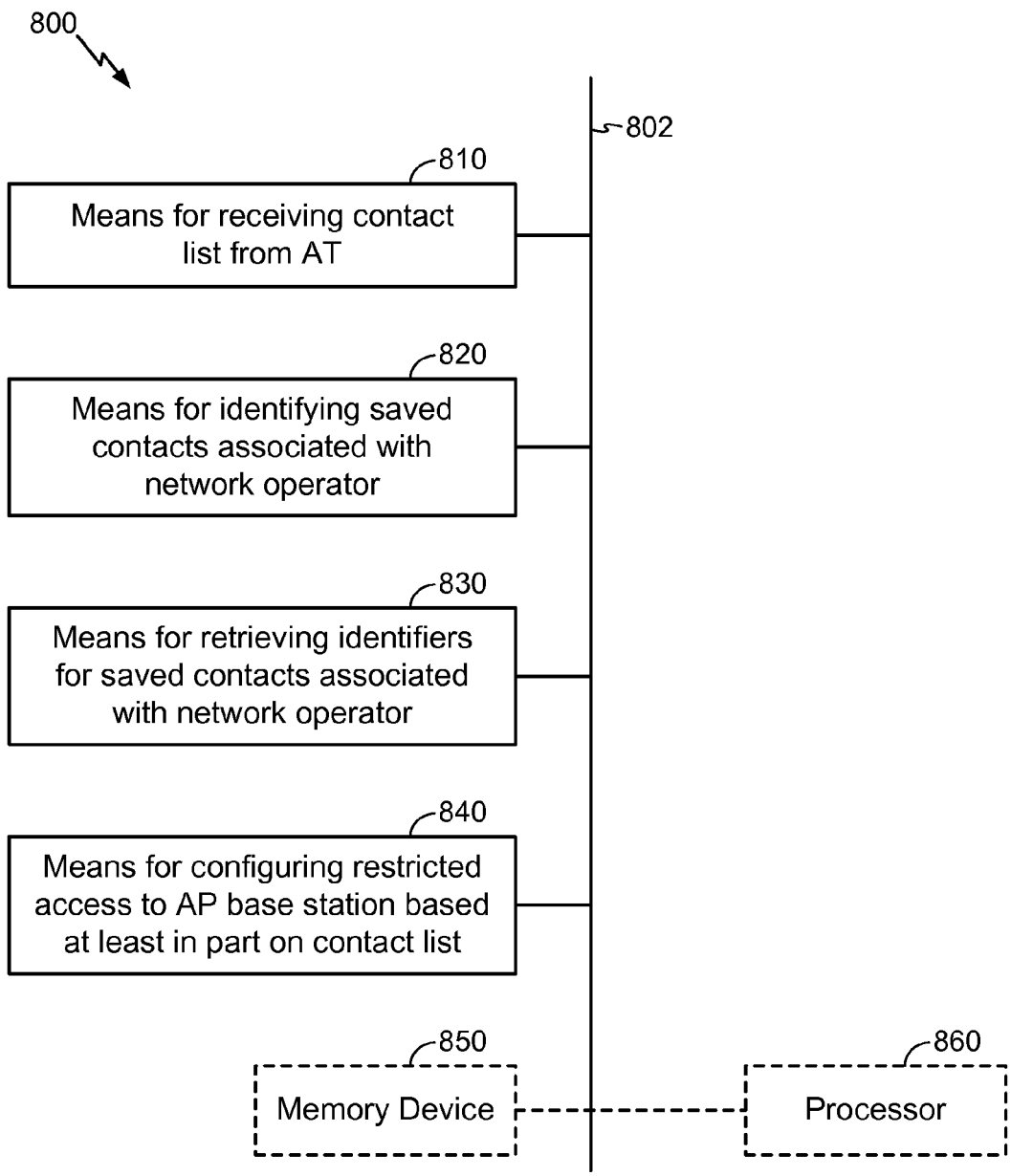
FIG. 8 illustrates an exemplary apparatus for restricted access configuration of an AP base station.

In accordance with one or more aspects of the embodiments described herein, there are provided devices and apparatuses for restricted access configuration of an AP base station. With reference to FIG. 8, there is provided an exemplary apparatus for restricted access configuration of an AP base station. It is noted that apparatus 800 may be configured as either a communication terminal or device, or as a processor or similar device for use within a communication terminal, device or an AP.

As illustrated, the apparatus 800 includes a means 810 for receiving a contact list from an AT. Apparatus 800 may also include an optional means 820 for identifying those saved contacts associated with a network operator. Apparatus 800 may further include an optional means 830 for retrieving identifiers for those saved contacts associated with the network operator. Apparatus 800 may also include a means 840 for configuring restricted access to the AP base station based at least in part on information in the contact list.

Furthermore, the apparatus 800 may optionally include a processor 850 in the case of an apparatus 800 configured as a communication terminal, rather than as a processor. Processor 850, in such case, may be in operative communication with the means 810, 820, 830, 840 via a bus 802 or similar communication coupling. Processor 850 may effect initiation and scheduling of the processes or functions performed by the means 810, 820, 830, 840.

Also, the apparatus 800 may include an optional computer readable medium or memory device 860 that may be operatively coupled to the other components of the apparatus 800 via bus 802 or the like. The computer readable medium or memory device 860 may be adapted to store computer readable instructions and data for effecting the processes and behavior of either the means 810, 820, 830, 840 or processor 850 (in the case of apparatus 800 configured as a terminal) or the methods disclosed herein.

Figure 9A:
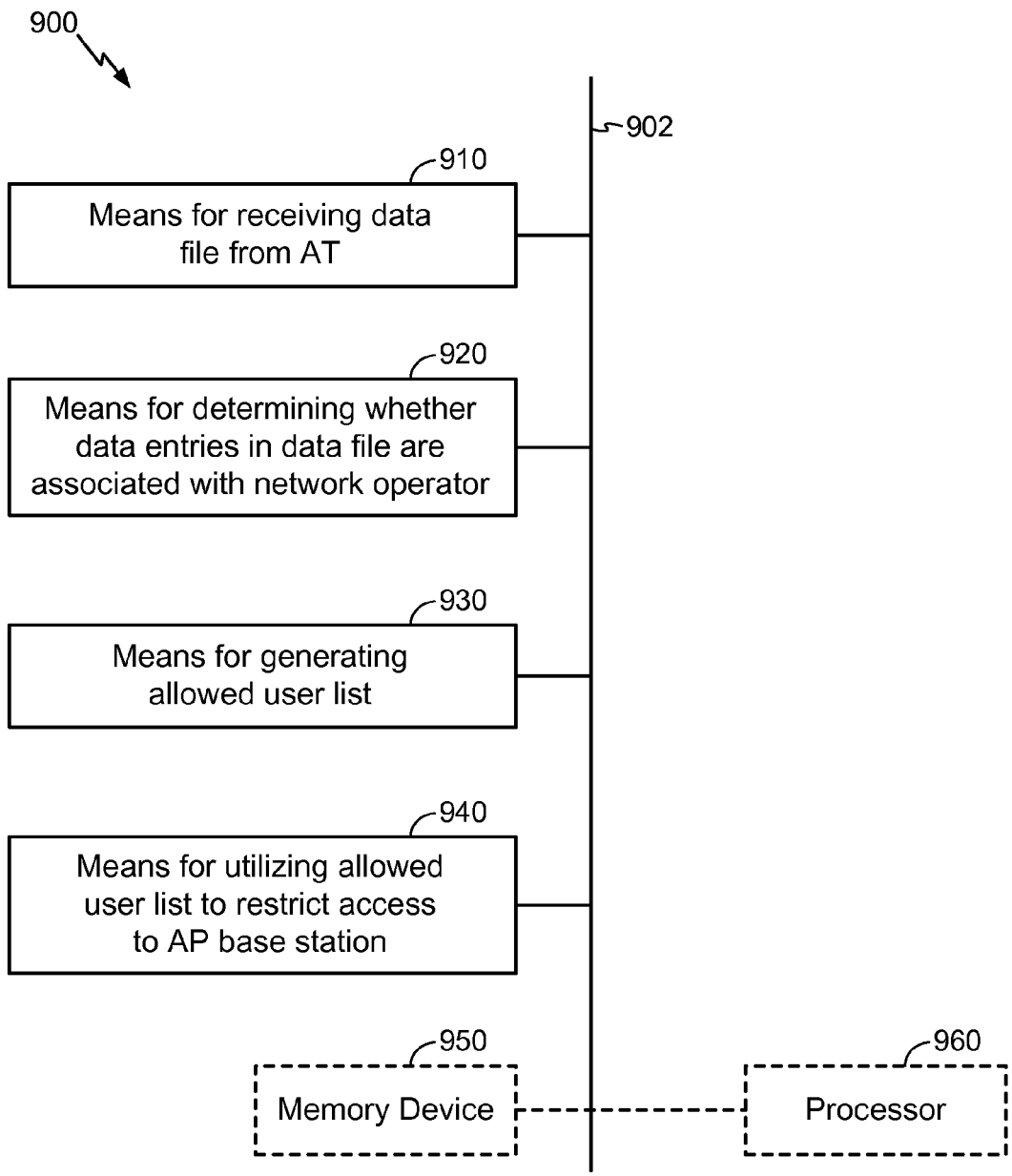
FIG. 9A illustrates another exemplary apparatus for restricted access configuration of an AP base station.

With reference to FIG. 9A, there is provided another exemplary apparatus for restricted access configuration of an AP base station. Apparatus 900 may be configured as either a communication terminal or device, or as a processor or similar device for use within a communication terminal, device or an AP. As illustrated, the apparatus 900 includes a means 910 for receiving or retrieving a data file from an AT. Apparatus 900 may also include an optional means 920 for determining whether data entries in the data file are associated with a network operator. Apparatus 900 may further include a means 930 for generating an allowed user list based at least in part on the data file from the AT. Apparatus 900 may also include a means 940 for utilizing the allowed user list to restrict access to the AP base station.

Figure 9B:
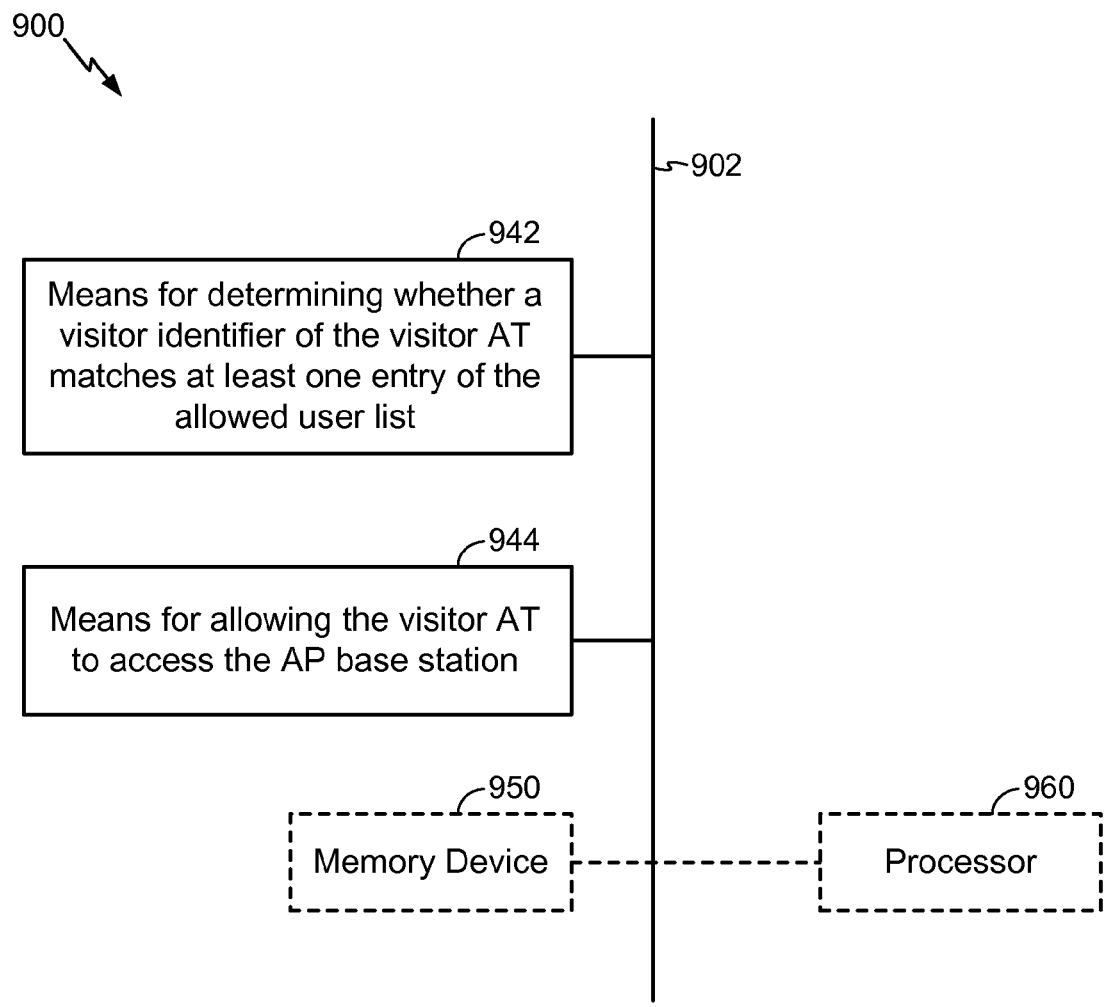
FIG. 9B is a simplified block diagram of several sample aspects of an apparatus for restricted access configuration of an AP base station.

As shown in FIG. 9B, the utilizing means 940 may comprise a means 942 for determining whether a visitor identifier of a visitor AT matches at least one entry of the allowed user list, in response to the visitor AT entering a coverage area of the AP base station. The utilizing means 940 may further comprise a means 944 for allowing the visitor AT to access the AP base station, in response to the visitor identifier matching the at least one entry of the allowed user list.

Furthermore, the apparatus 900 may optionally include a processor 950 in the case of an apparatus 900 configured as a communication terminal, rather than as a processor. Processor 950, in such case, may be in operative communication with the means 910, 920, 930, 940, 942, 944 via a bus 902 or similar communication coupling. Processor 950 may effect initiation and scheduling of the processes or functions performed by the means 910, 920, 930, 940, 942, 944.

Also, the apparatus 900 may include an optional computer readable medium or memory device 960 that may be operatively coupled to the other components of the apparatus 900 via bus 902 or the like. The computer readable medium or memory device 960 may be adapted to store computer readable instructions and data for effecting the processes and behavior of either the means 910, 920, 930, 940, 942, 944 or processor 950 (in the case of apparatus 900 configured as a terminal) or the methods disclosed herein.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

It will be appreciated that, in accordance with one or more aspects described herein, inferences can be made regarding determining communication parameters for a plurality of surrounding femto cells and/or macro cells as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure The accompanying method claims present elements of the various steps in sample order, and are not meant to be limited to the specific order or hierarchy presented.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, various embodiments are described herein in connection with a mobile device. A mobile device can also be called a system, subscriber unit, subscriber station, mobile station, mobile, remote station, remote terminal, Access Terminal (AT), user terminal, terminal, wireless communication device, user agent, user device, or User Equipment (UE). A mobile device can be a cellular telephone, a cordless telephone, a Session Initiation Protocol (SIP) phone, a Wireless Local Loop (WLL) station, a Personal Digital Assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may includes W-CDMA and/or other variants of CDMA. CDMA2000covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, cdma2000, IS-856, W-CDMA, TD-SCDMA, etc.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for a restricted access configuration of an access point (AP) base station, comprising:
    retrieving a contact list from an access terminal (AT) associated with the AP base station, the contact list comprising information regarding saved contacts of an AT user;
    determining whether any of the saved contacts are associated with a network operator based on at least one identifier for the saved contacts being associated with the network operator; and
    configuring a restricted access to the AP base station based at least in part on converting a portion of the saved contacts being associated with the network operator into subscriber identities of corresponding subscribers of a network with which the AP base station is associated, wherein the subscriber identities at least comprise identifiers temporarily generated to provide secure communications between the AP base station and other entities.

2. The method of claim 1, further comprising verifying an ownership of the AP base station based on obtained information relating to the AT or the AT user.

3. The method of claim 2, wherein the obtained information comprises receiving a password associated with the AP base station from the AT or the AT user.

4. The method of claim 1, wherein the AP base station is associated with the network operator.

5. The method of claim 1, wherein the determining comprises retrieving the at least one identifier for the saved contacts associated with the network operator.

6. The method of claim 5, wherein retrieving the at least one identifier comprises retrieving the at least one identifier from the contact list.

7. The method of claim 6, wherein the retrieving is performed via an application level software installed on the AT.

8. The method of claim 5, wherein retrieving the at least one identifier comprises retrieving the at least one identifier from a registry of the network operator.

9. The method of claim 8, wherein retrieving the at least one identifier from the registry comprises accessing a home location register (HLR) of the network operator.

10. The method of claim 5, further comprising generating an allowed user list based at least in part on the saved contacts associated with the at least one identifier.

11. The method of claim 10, further comprising utilizing the allowed user list to configure the restricted access.

12. The method of claim 11, further comprising, in response to a visitor AT entering a coverage area of the AP base station, determining whether a visitor identifier of the visitor AT matches at least one entry of the allowed user list.

13. The method of claim 12, further comprising, in response to the visitor identifier matching the at least one entry of the allowed user list, allowing the visitor AT to access the AP base station.

14. The method of claim 1, further comprising:
deleting ones of the saved contacts that are not associated with the network operator.

15. The method of claim 1, further comprising:
identifying at least a portion of the saved contacts associated with different network operators; and
generating a restricted access contact list for the identified saved contacts associated with the different network operators.

16. A wireless communication device for a restricted access configuration of an access point (AP) base station, comprising:
a receiver adapted to receive a contact list from an access terminal (AT) associated with the AP base station, the contact list comprising information regarding saved contacts of an AT user;
at least one processor in operative communication with the receiver, wherein the at least one processor is adapted to determine whether any of the saved contacts are associated with a network operator based on at least one identifier for the saved contacts being associated with the network operator; and
a memory in operative communication with the at least one processor and comprising executable code for the at least one processor to configure a restricted access to the AP base station based at least in part on converting a portion of the saved contacts being associated with the network operator into subscriber identities of corresponding subscribers of a network with which the AP base station is associated, wherein the subscriber identities at least comprise identifiers temporarily generated to provide secure communications between the AP base station and other entities.

17. The device of claim 16, wherein the at least one processor verifies an ownership of the AP base station based on obtained information relating to the AT or the AT user.

18. The device of claim 17, wherein the obtained information comprises receiving a password associated with the AP base station from the AT or the AT user.

19. The device of claim 16, wherein the AP base station is associated with the network operator.

20. The device of claim 16, wherein the at least one processor is adapted to retrieve the at least one identifier for the saved contacts associated with the network operator.

21. The device of claim 20, wherein the at least one processor is adapted to generate an allowed user list that at least includes the saved contacts associated with the at least one identifier.

22. The device of claim 21, wherein the at least one processor is adapted to utilize the allowed user list to configured the restricted access to the AP base station.

23. The device of claim 22, wherein the at least one processor is adapted to, in response to a visitor AT entering a coverage area of the AP base station, determine whether a visitor identifier of the visitor AT matches at least one entry of the allowed user list.

24. The device of claim 23, wherein the at least one processor is adapted to, in response to the visitor identifier matching the at least one entry of the allowed user list, allow the visitor AT to access the AP base station.

25. The device of claim 20, wherein the retrieving is performed via an application level software installed on the AT.

26. The device of claim 16, wherein the at least one processor is adapted to:
delete ones of the saved contacts that are not associated with the network operator.

27. The device of claim 16, wherein the at least one processor is adapted to:
identify at least a portion of the saved contacts associated with different network operators; and
generate a restricted access contact list for the identified saved contacts associated with the different network operators.

28. A wireless communication apparatus for restricted access configuration of an access point (AP) base station, comprising:
means for retrieving a contact list from an access terminal (AT) associated with the AP base station, the contact list comprising information regarding saved contacts of an AT user;
means for determining whether any of the saved contacts are associated with a network operator based on at least one identifier for the saved contacts being associated with the network operator; and
means for configuring restricted access to the AP base station based at least in part on converting a portion of the saved contacts being associated with the network operator into subscriber identities of corresponding subscribers of a network with which the AP base station is associated, wherein the subscriber identities at least comprise identifiers temporarily generated to provide secure communications between the AP base station and other entities.

29. The apparatus of claim 28, further comprising means for verifying an ownership of the AP base station based on obtained information relating to the AT or the AT user.

30. The apparatus of claim 29, wherein the obtained information comprises means for receiving a password associated with the AP base station from the AT or the AT user.

31. The apparatus of claim 28, wherein the AP base station is associated with the network operator.

32. The apparatus of claim 28, further comprising means for retrieving the at least one identifier for the saved contacts associated with the network operator.

33. The apparatus of claim 32, further comprising means for generating an allowed user list that at least includes the saved contacts associated with the at least one identifier.

34. A computer program product, comprising:
a non-transitory computer-readable medium, comprising:
code for retrieving a contact list from an access terminal (AT) associated with an access point (AP) base station, the contact list comprising information regarding saved contacts of an AT user;
code for determining whether any of the saved contacts are associated with a network operator based on at least one identifier for the saved contacts being associated with the network operator; and
code for configuring a restricted access to the AP base station based at least in part on converting a portion of the saved contacts being associated with the network operator into subscriber identities of corresponding subscribers of a network with which the AP base station is associated, wherein the subscriber identities at least comprise identifiers temporarily generated to provide secure communications between the AP base station and other entities.

\* \* \* \* \*